(12) United States Patent
Zhornitskiy

(10) Patent No.: US 7,909,173 B2
(45) Date of Patent: Mar. 22, 2011

(54) COMBINED CENTRIFUGAL SEPARATOR

(76) Inventor: Boris Elyevich Zhornitskiy, Jacksonville, FL (US)

( * ) Notice: Subject to any disclaimer, the term of this patent is extended or adjusted under 35 U.S.C. 154(b) by 0 days.

(21) Appl. No.: 11/928,975

(22) Filed: Oct. 30, 2007

(65) Prior Publication Data

US 2009/0107901 A1    Apr. 30, 2009

(51) Int. Cl.
*B01D 33/27* (2006.01)
*B01D 33/46* (2006.01)

(52) U.S. Cl. .................. 210/373; 210/369; 210/196

(58) Field of Classification Search ............... 210/360.1, 210/369, 372, 373, 378, 380.1, 194, 196
See application file for complete search history.

(56) References Cited

U.S. PATENT DOCUMENTS

| | | | | |
|---|---|---|---|---|
| 1,586,395 A * | 5/1926 | Behr | | 210/374 |
| 1,903,795 A * | 4/1933 | Rigler | | 210/213 |
| 2,688,405 A * | 9/1954 | Sharples | | 210/179 |
| 3,011,647 A * | 12/1961 | Elsken | | 210/374 |
| 3,642,139 A * | 2/1972 | Wilson et al. | | 210/213 |
| 4,074,621 A * | 2/1978 | Cailliot | | 99/286 |
| 4,836,687 A * | 6/1989 | Kardoes et al. | | 366/286 |
| 6,405,877 B1 * | 6/2002 | Nemedi et al. | | 210/498 |

* cited by examiner

*Primary Examiner* — Fred Prince

(57) ABSTRACT

The combined centrifugal separator with supplementary work units is an autonomous stationary or mobile complex apparatus, which is related to the separation of non-uniform granular or fibrous product, such as manure pulps, fruit pulps, sugar contained pulps, pulps for the medicine, etc., from the liquid in which it is carried. The screen, the screen scraper, and the driving shaft, which has the screw, the crusher and the mixer located on it, all have one common axis. However, all three rotate with different speeds around it. They are connected to one motor, and have a transmission system using pulleys and gears. Part of the liquid remainder may be used for internal recycling.

3 Claims, 6 Drawing Sheets

COMBINED CENTRIFUGAL SEPARATOR

BACKGROUND OF THE INVENTION

Field of the Invention

This invention is designed to fractionate hydraulic suspensions with non-uniform granular or fibrous structure of solid particles, into liquid and solid parts. The apparatus is meant to be all-inclusive, autonomous and mobile device, which can perform all stages necessary in order to separate liquid and solid matter. It has to load the influent at any angle, prepare it for the fractionation, separate and unload liquid and solid part into two different outlets.

In the modern technology of moving, processing and utilization of pus-drainage, different mechanical devices, including centrifugal machines, screw presses, granulators, etc., are well known. The comparative analyses showed that the most effective method of fractionating of the higher moisture manure is the use of the centrifugal device with the continuous discharge of the solid fraction.

There is a need for improvement, because the existing means of recycling of the manure from livestock-breeding drains, such as stationary decanter centrifuges, orient on the large-scale manufacture and are unaffordable to other livestock breeding facilities. Majority farmers need an inexpensive lightweight mobile device for the preparation and fractionation of manure with different degrees of higher moisture. The apparatus must be independent, complex, centrifugal, and with continuous action, in order to dose, stabilize, and transfer the manure with high efficiency and low operational costs.

The design of the invention has significant advantages over the existing stationary decanter centrifuges. It is much more efficient in removing solid particles (fibers) from the influent, and the achievable moisture level of its solid fraction is significantly less. Its weight is expected to be at least 2-3 times lighter. It could be easily moved by a vehicle, making this device very flexible, and easy to operate. It can be operated at any angle between 0 and 90 degrees. It would use 2-3 times less energy per unit of solid fraction. It would be made out of less expensive materials. It would be equipped with additional supplementary work units providing a complete cycle of fractionation.

Usage of the device will allow production of Biosolids from livestock-breeding drainage. Biosolids can be used for the economic and non-polluting manufacture of the fertilization, biomass, biogas, and oil, which will help protect environment.

SUMMARY OF THE INVENTION

The invention is an independent stationary or mobile separator with continuous action. The combination of various transmission units, joints and elements of the design, allows to localize the loading, internally recycle some of the liquid remainder, to prepare, translate and to fractionate suspensions.

The proposed centrifuge consists of a stationary cylinder tube with an extension, suspension inlet, and solid fraction and liquid fraction outlets. The rotating working units all have the same axis of rotation. The crusher, which is a grinding mechanism consisting of the dowels attached to axle and the incasing tube, is designed to reduce the lumps in the influent. The mixer, which is a propeller-type screw, pushes the influent further and mixes it to the required consistency for the centrifugal separation. A conveyor-type screw moves the influent further, and the water is pushed out by the centrifugal forces through a rotating screen drum. The speed of rotation of the screen is slightly faster than the speed of rotation of the screw axle. The screen scraper rotates inside the screen with a slightly faster speed, and pushes the sediment into the solid part outlet. Part of the liquid remainder goes to the liquid outlet. Another part may be recycled internally, to be mixed with the influent, for the required consistency for the separation.

DETAILED DESCRIPTION OF THE INVENTION

Figure 6:
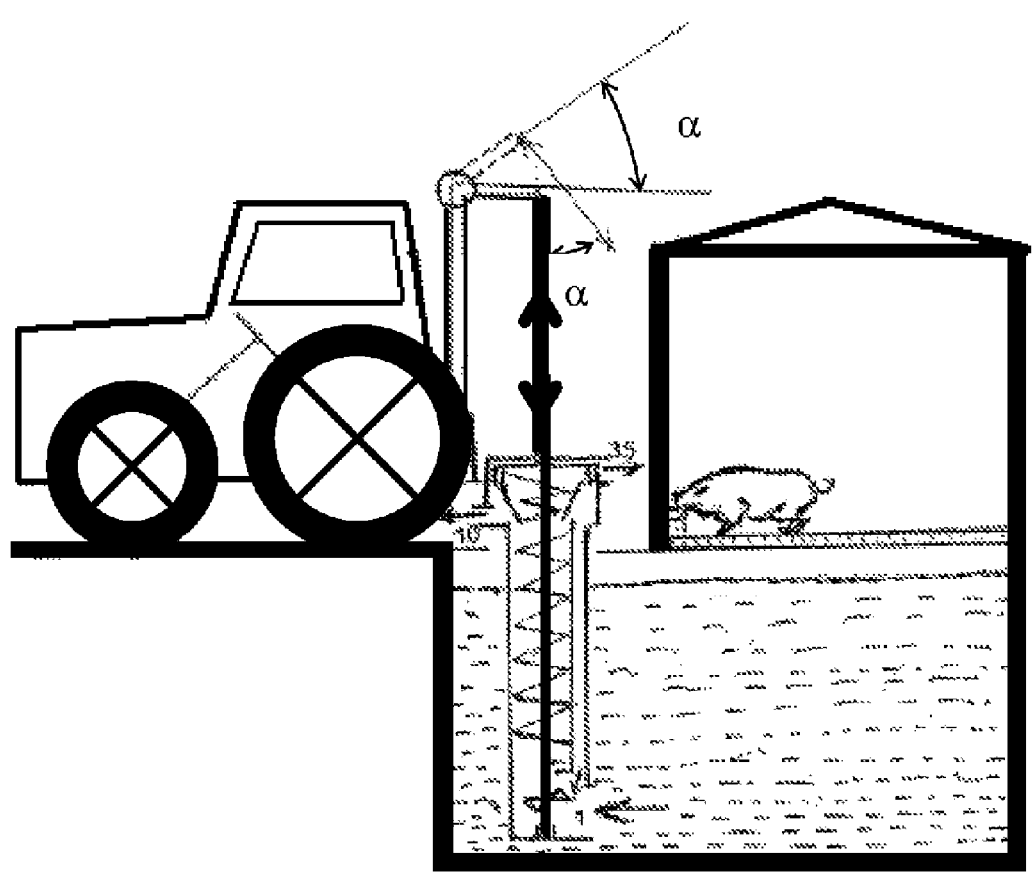
FIG. 6. An Example of an Application of the Autonomous Centrifugal Separator

Stationing the apparatus into its working position may be done using a standard schematic and the apparatus may be used vertically or at an angle $\alpha$, as shown in FIG. 6. Usually the driving force of the separator is an electric motor or a rotating shaft powered by other sources such as a gasoline motor. The materials used in the making of manure separator are practically the same as those in similar machines, but less material per unit is needed in the production of this apparatus.

A basic combined centrifugal separator has its drive located on top. For easy access inside the separator and the drive, the main housing 30 has the lid 37 and the main housing 30 also comes off of the incasing of the loader 32. The loading screw 6 may be removable, if needed, via the loading screw connection 36. The rotation of the driving shaft 25 is provided by the motorized drive 29 via the driving pulley 26, the belt gear 23, and the supporting pulley 24, which is located on the upper part of the drive shaft 25. The drive shaft 25 goes through the hollow shaft 34 of the screen scraper and is connected to it by the bearings 17 and 18. On the bottom, the drive shaft 25 rotates inside of the bushing 3 of the shaft base 2.

Figure 2:
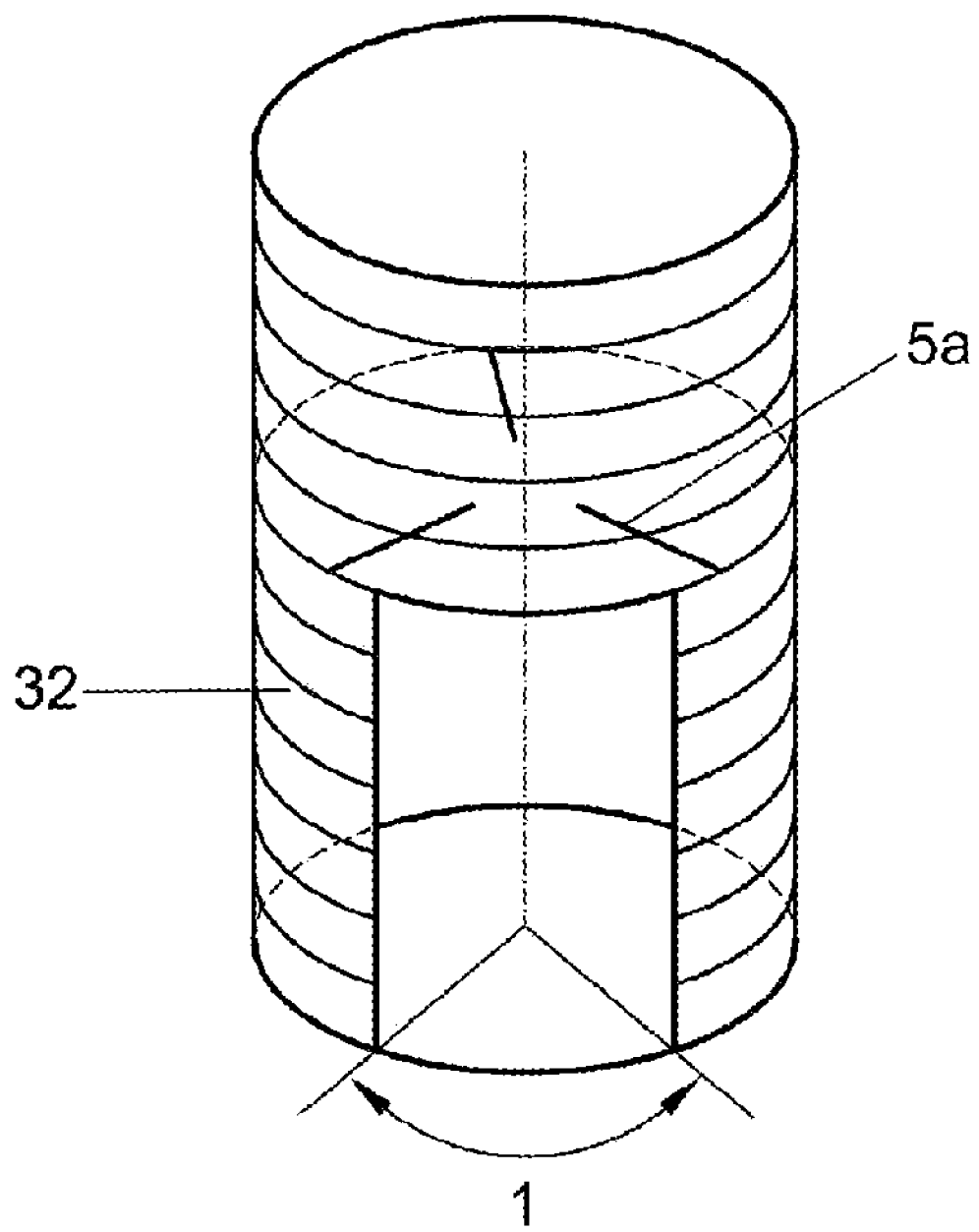
FIG. 2. Inlet for the Incoming Matter to Be Separated
Figure 3:
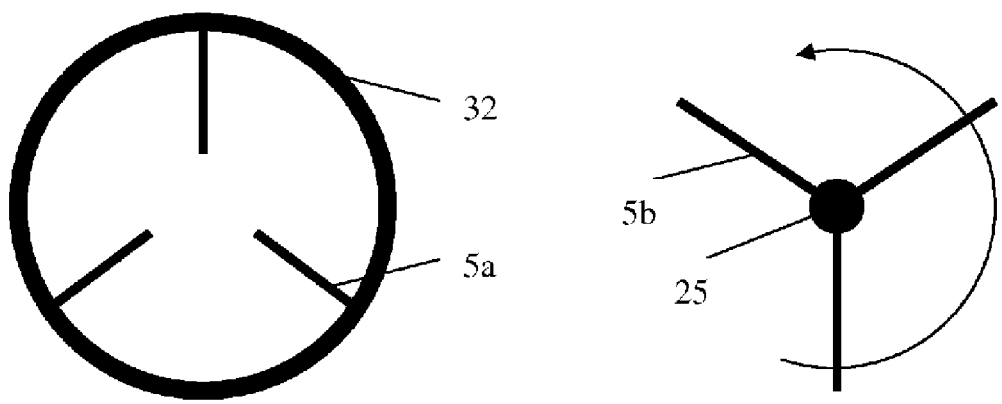
FIG. 3. Top View of the Crushing Mechanism with the Dowels

The influent is delivered from the loading zone 1 to the mixer 4 and the crusher 5ab and is then mixed with the recycled liquid remainder, as shown in FIG. 2. The crusher 5ab consists of fixed components such as dowels 5a, affixed on the inside of the incasing of the loader 32, as shown in FIG. 2, and of the rotating cutting dowels 5b, affixed to the loader shaft 25, as shown in FIG. 3. The purpose of the crusher 5ab is to reduce lumps of the influent in the loading zone, as it is mixed with the liquid remainder from the drain 7.

The mixer 4 is a bladed screw designed to feed the influent without interruption into the incasing of the loader 32, to mix it to the needed consistency, and to transport it to the loading screw 6. The loading screw 6 is typical, and its spiral is located on the driving shaft 25.

Figure 1:
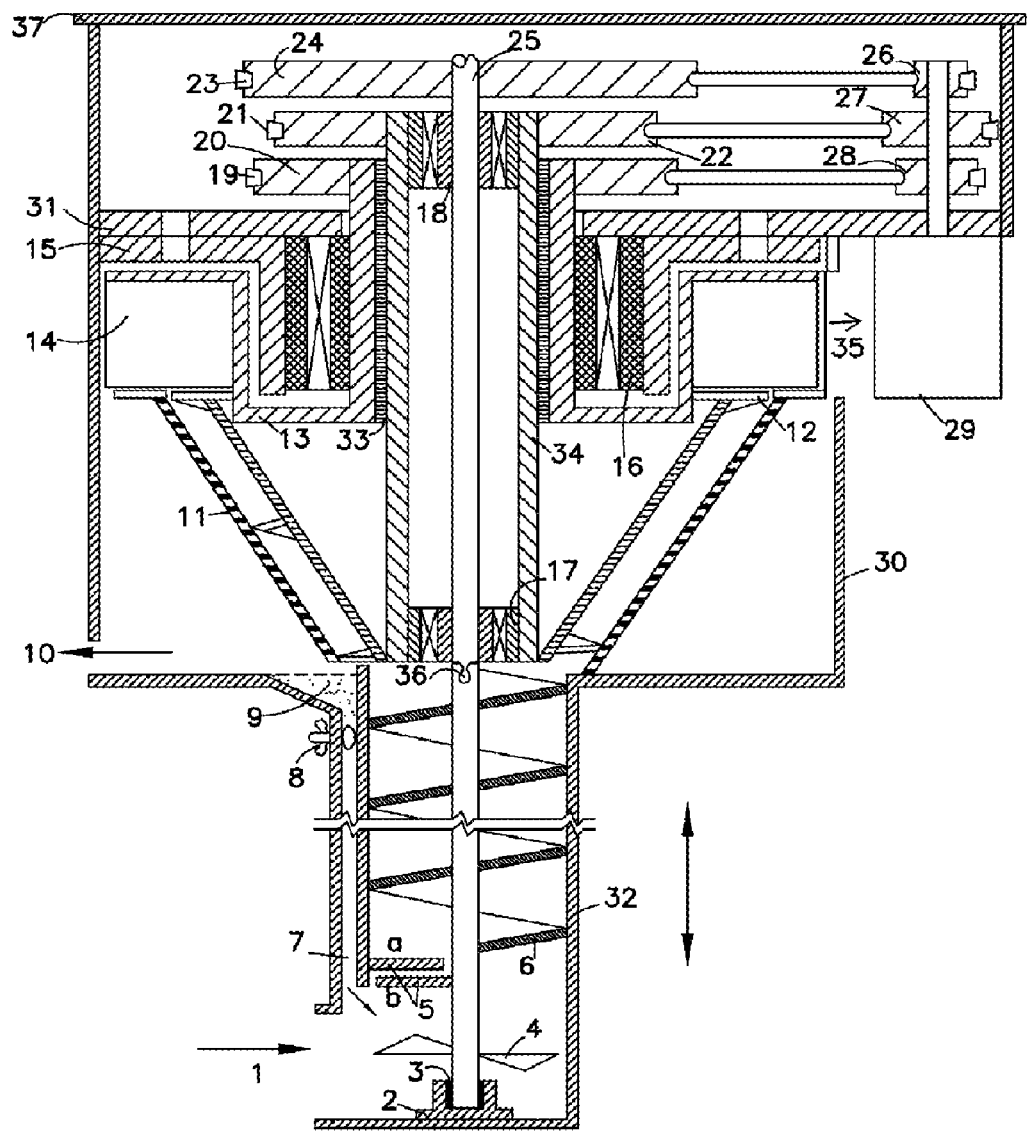
FIG. 1. Vertical Cross-Section of the Autonomous Centrifugal Separator

The driving shaft 25, the screen 11, and the screen sediment scraper 12 have a common axis of rotation and are all arranged in a vertical position and rotate with different speeds, as shown in FIG. 1. The shaft 25 will rotate with a slower speed than that of the screen 11 and the screen scraper 12, sufficient for the preparation of the mass and loading into the separator screen 11.

The mass comes out of the incasing of the loader 32 and into the screen 11, where the sediment is moved by the screen scraper 12, to the sediment outlet 14. The screen scraper 12 is a spiral part of the screw, which rotates inside the screen 11, around the same axis, but with the greater speed than the screen, and moves the sediment from out of the narrow lower part of the screen 11 into the wide upper part. The size of a step of the spiral of the screen scraper 12 allows it to move the sediment inside the screen, and also to clean the perforations of the screen 11.

Figure 5:
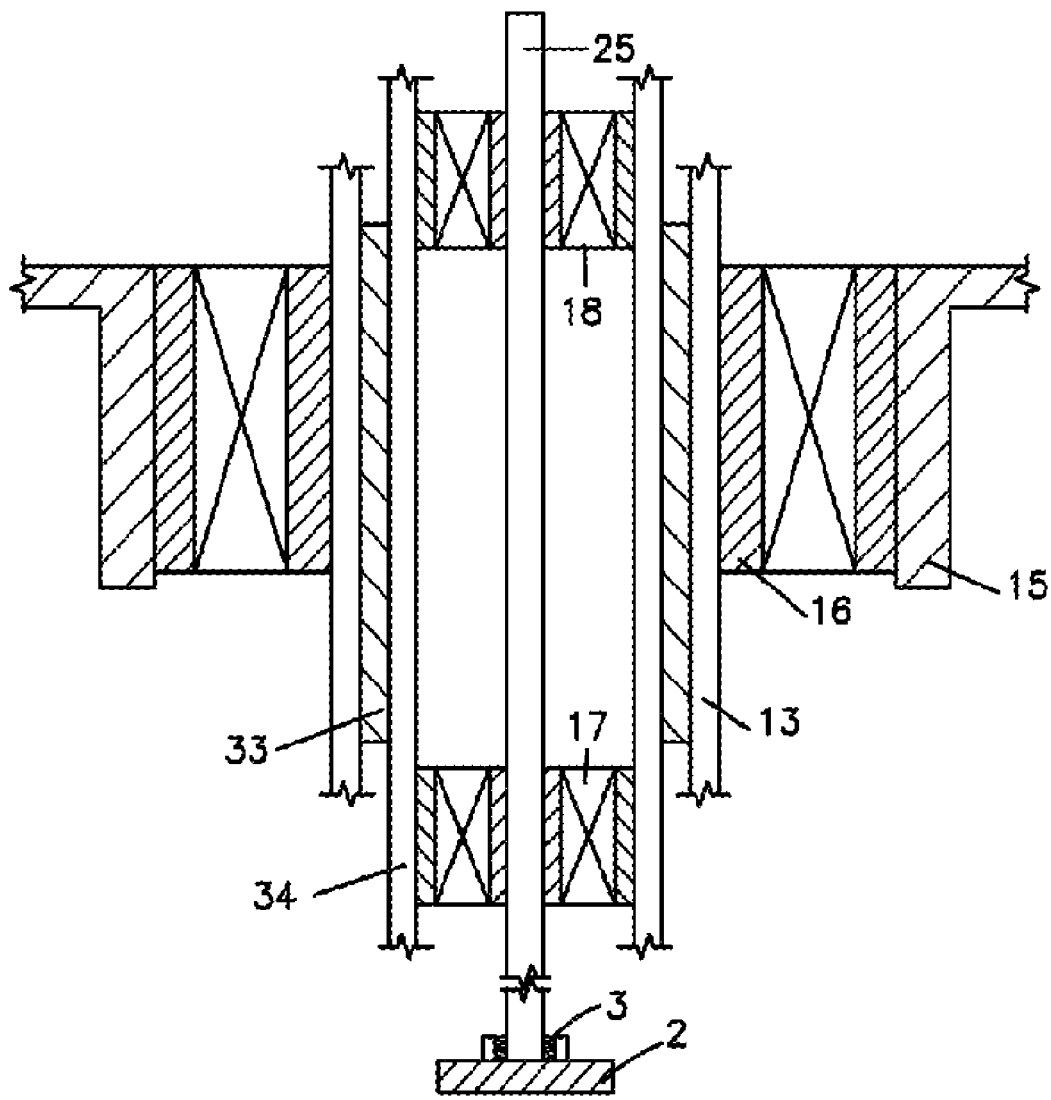
FIG. 5. Combination of Parts Rotating with Three Different Speeds

The screen scraper 12 is set into motion by the hollow shaft 34. On the upper part of the hollow shaft 34 is the supporting pulley 22, which is rotated by the driving motorized drive 29 through the driving pulley 27 and the belt gear 21. The hollow shaft 34 of the screen scraper rotates inside of a bushing 33, through which it is connected with the screen drive 13, as shown in FIG. 5. The supporting pulley 20 moves the screen drive 13. The supporting pulley 20 is connected to the drive 29 via the belt gear 19 and the driving pulley 28. The screen drive 13 is fixed on the inside bushing of the bearing 16 that is connected to the base tile 31 through the incasing of the bearing 15.

Figure 4:
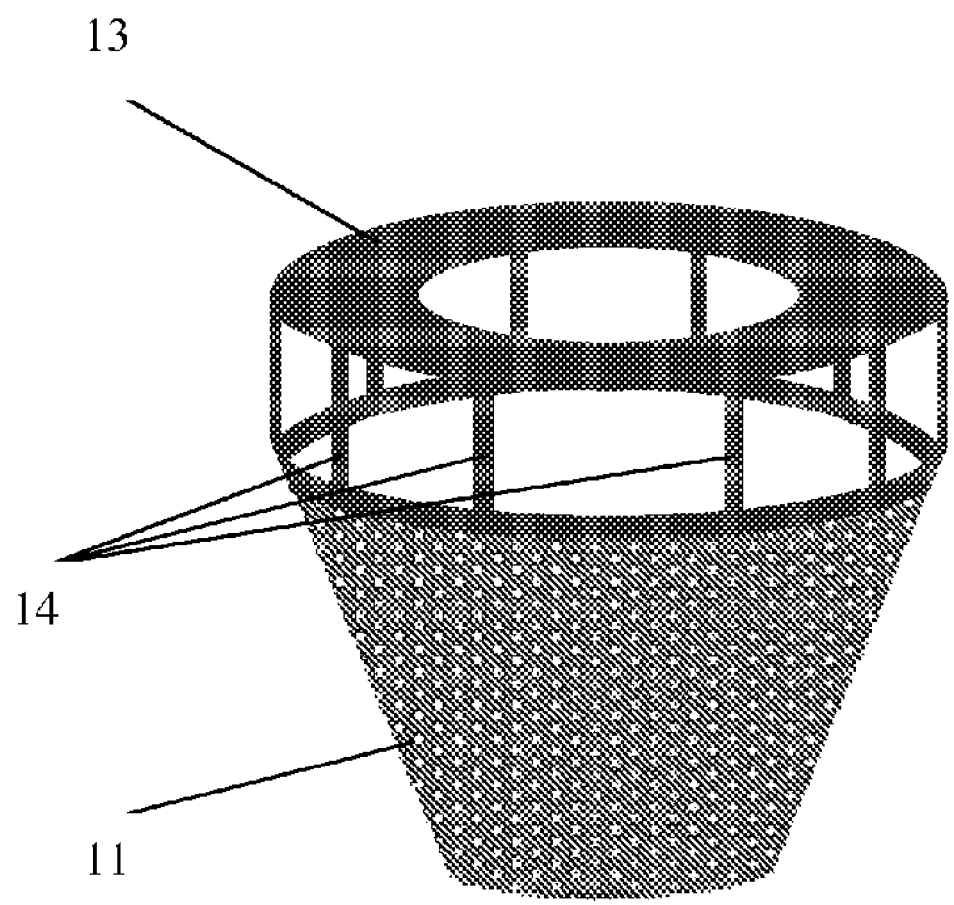
FIG. 4. Rotating Drum with the Screen and the Outlet for a Solid Fraction

The screen 11 is rotated by the drive 13, via the vertical bars of the sediment discharge 14, which also act as the screen support, as shown in FIG. 4. The screen 11, which could be a perforated surface or a membrane with a multitude of holes or slots or the like, is an upside down truncated cone whose base is greater in diameter than the top. Through this screen 11, most of the liquid is extracted out of the influent, due to the centrifugal force. One part of the liquid comes out of the separator right away through the drain 10, and the other part, in the recycling mode, goes through the drain 9 and the adjustable valve 8 into the incasing of the loader 32. The screen scraper 12 moves the residue on the screen up, and removes it via the discharge 14 and through the outlet 35.

It is important to understand that the power of the motor, the proportion of the sizes of different components and diameters of holes of the apparatus, or the width of the slots in the screen, velocities of rotation of components, or the volume of the recycled liquid remainder have to accommodate the application chosen. This fact can lead to some changes and variations of the construction, which can be made, without departing from the essence of the invention.

What is claimed is:

1. An autonomous and mobile centrifugal apparatus for fractionating hydraulic suspensions with non-uniform granular or fibrous structure of solid particles, into liquid and solid parts, said apparatus comprising:

a main housing having a lid for easy access inside said centrifugal apparatus;

a screen located inside said main housing, said screen having a shape of an upside down hollow truncated cone, said screen having a round top and a round bottom parallel to each other, said screen having an axis of rotation that passes through the centers of said top and bottom, said screen having a perforated surface with a multitude of holes, said screen being rotated around said axis of rotation;

a screen scraper having a hollow shaft having a spiral of flights connected to said hollow shaft, said screen scraper being rotated inside said screen, around said axis of rotation, having greater speed of rotation than said screen;

a drive shaft located inside said hollow shaft of said screen scraper, said drive shaft being rotated around said axis of rotation, but with a lower speed of rotation than that of said screen;

a loading screw located under said screen, said loading screw having a spiral of flights connected to said drive shaft, said loading screw having a loading screw connection which allows said loading screw to be connected and disconnected from the rest of said drive shaft;

a loading screw incasing having a hollow tube enveloping said loading screw, said loading screw incasing being located under said main housing, said loading screw incasing being removable from said screen housing;

a crusher located under said loading screw, said crusher having a number of dowels attached perpendicularly to the inside of said loading screw incasing and a number of dowels attached perpendicularly to said drive shaft, for reducing lumps in the influent to be processed by said centrifugal separator;

a mixer located below said crusher, said mixer having series of blades attached to said drive shaft in a spiral pattern, for continuous loading of said influent into said loading screw incasing, mixing said influent to the needed consistency and transporting it to said loading screw;

drive means located on the upper part of said drive shaft, for rotating said drive shaft and said screen and said screen scraper at different speeds via pulleys and belt gears;

a loading zone, having an opening located at the bottom of said incasing of the loader for receiving of said influent;

a sediment outlet located on top of said screen, said sediment outlet having vertical bars attaching said screen to a screen drive, said screen drive having a shape of a circular disc with a round hole in the center of said disc, said sediment outlet having spaces between said vertical bars for receiving the sediment removed by said screen scraper; and, a liquid outlet located at the bottom of said main housing, for receiving the liquid extracted out of said influent through said screen.

2. A centrifugal apparatus as described in claim 1 wherein:
a part of the liquid from said liquid outlet may be recycled internally via a drain located next to said loading screw incasing and an adjustable valve that opens and closes said drain, and said liquid being mixed with said influent.

3. A centrifugal apparatus as described in claim 1 wherein:
said centrifugal apparatus has means to be stationed or attached to a transporting vehicle at a vertical or inclined angle.

* * * * *